Jan. 16, 1923.
T. J. F. M. DE MARTEL.
ÉCRASEUR FOR THE STOMACH AND INTESTINES.
FILED OCT. 18, 1919.
1,442,778.
3 SHEETS—SHEET 1.
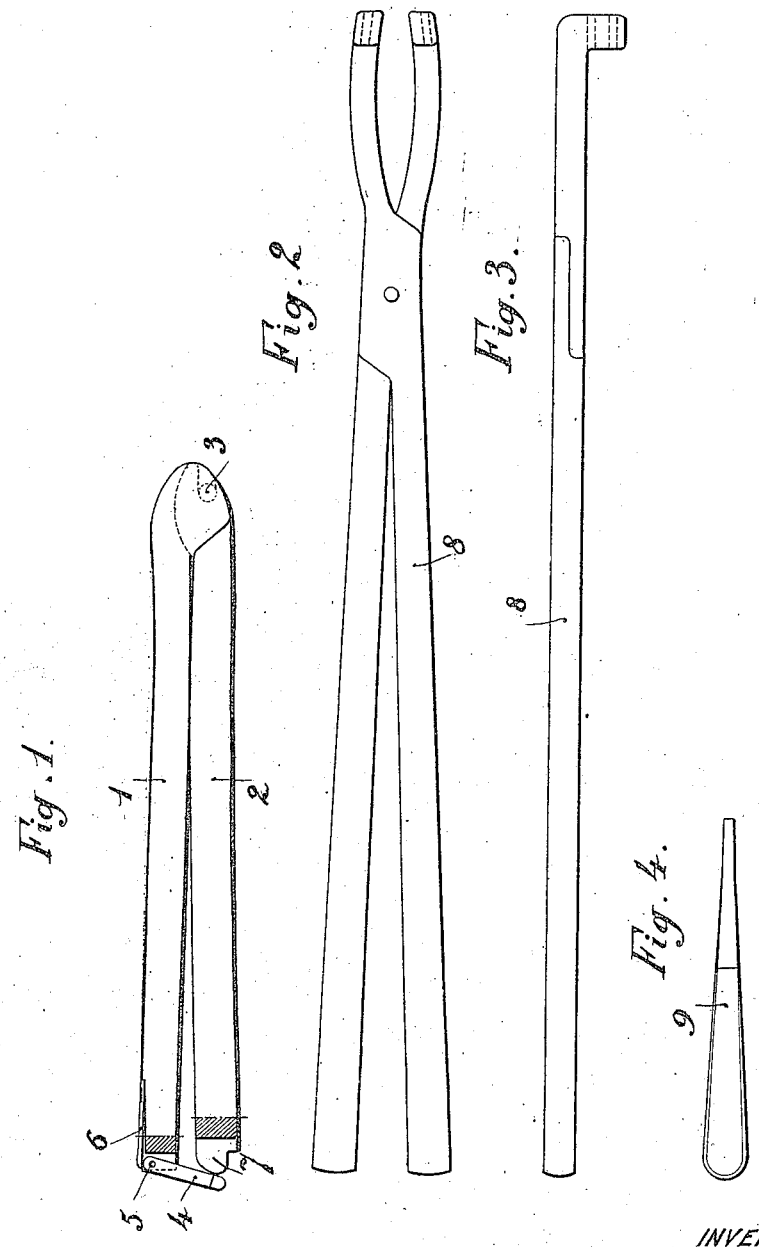
INVENTOR
T.J.F.M. de Martel.
BY
ATTORNEYS Jan. 16, 1923. 1,442,778.
T. J. F. M. DE MARTEL.
ÈCRASEUR FOR THE STOMACH AND INTESTINES.
FILED OCT. 18, 1919.
3 SHEETS—SHEET 2.
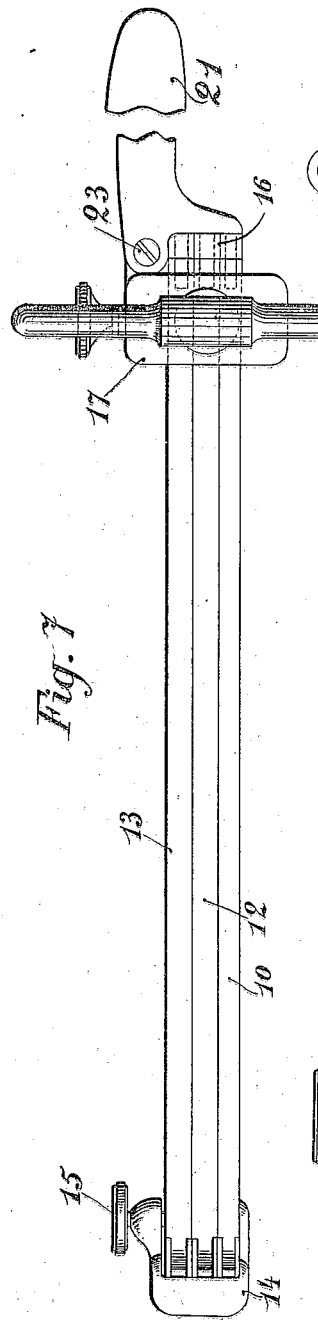
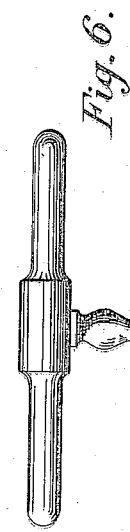
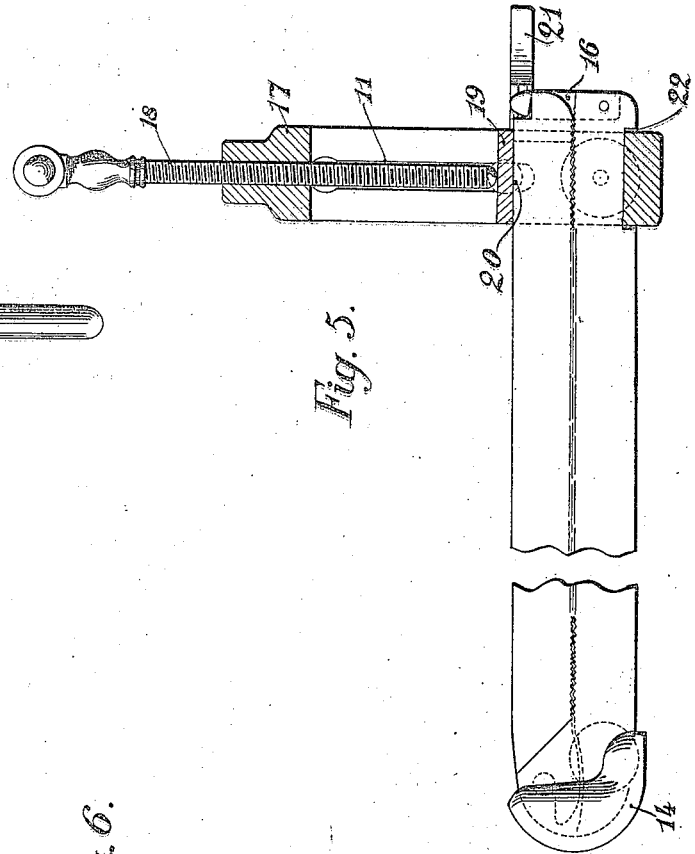
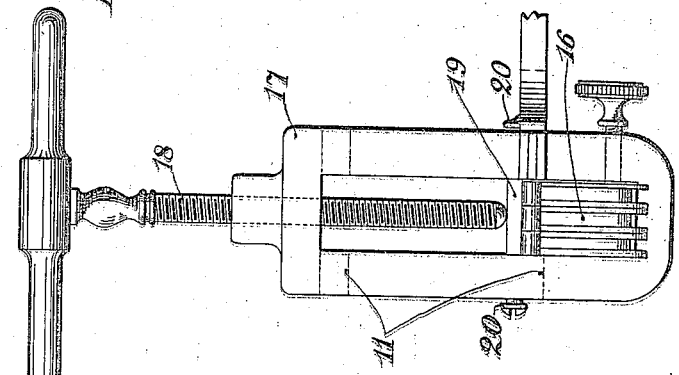
INVENTOR
T. J. F. M. de Martel
BY
ATTORNEYS Jan. 16, 1923. 1,442,778.
T. J. F. M. DE MARTEL.
ÉCRASEUR FOR THE STOMACH AND INTESTINES.
FILED OCT. 18, 1919. 3 SHEETS—SHEET 3.
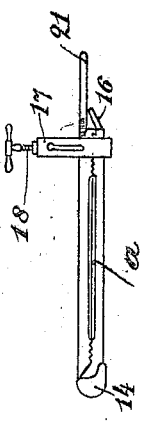
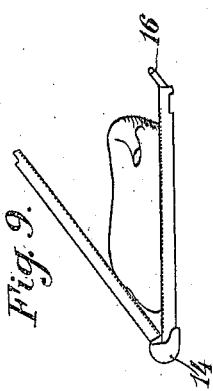
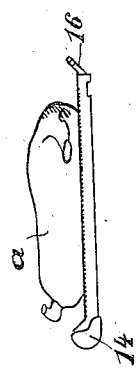
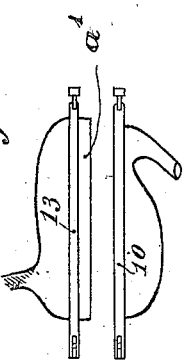
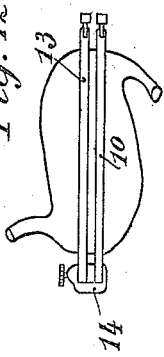
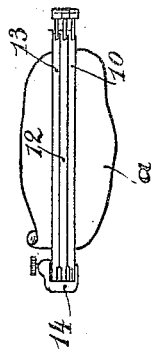
INVENTOR
T.J.F.M. de Martel.
BY
ATTORNEYS Patented Jan. 16, 1923.

1,442,778

UNITED STATES PATENT OFFICE.

THIERRY JEAN FRANÇOIS MARIE DE MARTEL, OF PARIS, FRANCE.

ÉCRASEUR FOR THE STOMACH AND INTESTINES.

Application filed October 18, 1919. Serial No. 331,638.

*To all whom it may concern:*

Be it known that I, THIERRY JEAN FRANÇOIS MARIE DE MARTEL, a citizen of the Republic of France, and residing at Paris, 20 Rue de Magdebourg, in the Republic of France, surgeon, have invented certain new and useful Improvements in Ecraseurs for the Stomach and Intestines, of which the following is a specification.

This invention relates to apparatus for crushing the hollow viscera such as the stomach and the intestines for example, the said system comprising one or more instruments each of which consists of a pair of levers detachably hinged at one end, the said arrangement allowing of easily placing the levers in position on two opposite sides of the viscus the hinge being placed at the side opposite the operator.

The invention also relates to the combination of three similar écraseurs placed side by side and in contact with one another, the said écraseurs thus juxtaposed being capable of being all locked together by an arrangement which allows of afterwards withdrawing the middle écraseur from between the two others; such a combination allows of dividing the viscus crushed between the two remaining écraseurs without any danger of opening the cavity of the said viscus.

The accompanying drawing represents by way of example a means of carrying out the invention and will enable the method of using the écraseur to be understood.

Figure 1 is an elevation of the écraseur partly in section.

Figures 2 and 3 are respectively a front elevation and a side elevation of the closing pincers.

Figure 4 is an elevation of the opening lever.

Figure 5 is an elevation partly in section of the complete apparatus, consisting of three écraseurs with their locking arrangement.

Figure 6 is an end view of this arrangement.

Figure 7 is a plan of Figure 5.

Figures 8, 9, 10, 11, 12 and 13 illustrate different stages of the operations for dividing a viscus such as the stomach *a*.

Figures 8, 9 and 10 are elevations.
Figures 11, 12 and 13 are plans.

The characteristic features of the écraseur are as follows:

It consists of two limbs 1 and 2 which can be very easily hinged together at one of their ends 3, and as easily unhinged.

When once hinged together the two limbs are closed over the viscus to be crushed after the manner of a pair of nut crackers.

One of the limbs has at its unjointed end a T-shaped locking bar movable upon a pivot 5.

The other limb has at its unjointed end a mortise 7 designed to receive the locking bar 4 when once the complete closure of the instrument and the crushing of the viscus has been effected.

If the two limbs were rectilinear they would fit perfectly one over the other when the instrument is closed empty, (that is to say when the latter does not contain the viscus to be crushed).

But, on the contrary, when the two limbs contain the viscus to be crushed these limbs by reason of their elasticity would become curved into a very slightly bent arc shape and would together describe a very elongated ellipse; the viscus would consequently be less effectively crushed at its middle part than at its ends.

To avoid this objection the two limbs, instead of being rectilinear are slightly incurved and opposed to each other by the convexity of their curve, so that their unjointed ends slightly separate from each other as shown in the drawing. In these conditions they can only be closed, even when empty, by exerting considerable force which straightens their curvature.

Owing to this arrangement the viscus is very equally crushed throughout its length.

To close the empty écraseur requires considerable force; to close it when full, greater force is required.

To effect this closure the operator employs suitable large pincers 8 (Figures 2 and 3) as capacious and strong as is necessary, these conditions of capacity and strength presenting no objection since the pincers are immediately replaced upon the instrument table when once the closure of the écraseur has been effected.

The operator grips the ends of the limbs of the écraseur in the jaws of the pincers and under the action of the spring 6 the locking bar 4 automatically enters the mortice 7 as soon as the limbs of the écraseur have been completely brought together.

To withdraw the écraseur the locking bar cannot be opened with the fingers. A rigid rod or lever 9 (Figure 4) is introduced into the end of the mortice 7 and by a movement of the movable end of the locking bar is raised which brings about the unhooking of the latter. The two limbs of the écraseur, are then unhinged and are withdrawn one after the other.

The advantages and characteristics of this instrument are as follows:

The hinging of the crushing limbs at their ends, which ensures very great force and prevents the viscus from creeping out beyond the crushing limbs.

The very simple method of hinging and facilitating the hinging and unhinging whatever may be the angle at which the limbs are to each other.

The firm closing of the crushing limbs at their other end by a bar coming automatically into position. This connection of the branches of the écraseur at their two ends and the special form given to the limbs ensures the perfect flattening of the viscus which cannot be effected with any other écraseur.

Finally the method of locking the limbs of the écraseur by means of separate pincers forming no part of the instrument, allows of applying considerable force without incumbering the field of operation, with an element which during the operation, is only of transitory use.

In using the écraseurs in a group, three écraseurs 10, 12, 13 (Figure 7) are placed side by side, their hinged end being located in a shoe 14 which allows of keeping them in juxtaposition and in alignment.

This shoe is provided with a set screw 15.

The simultaneously locking of the three écraseurs is effected by means of a lunette 17 (Figure 6) provided with a screw 18 acting upon a slide 19 having two studs 20 and sliding in slots 11 (Figures 5 and 6); the said lunette is placed in grooves 22 (Figure 5) made in the lower limbs of the écraseurs and carries the pressure screw 18 which allows of firmly pressing the slide 19 upon the upper limbs in order to lower them until they contact with the lower limbs.

A lever 21 jointed at 23 upon the lunette allows when the pressure has been obtained, of simultaneously bringing the three locking bars 16 into the closing position upon the upper limbs of the écraseurs in order to keep the latter in the locked position.

The operation of the instrument is explained by Figures 8 to 13. The lower limbs of the écraseurs placed together in the shoe 14 are disposed beneath the affected viscus at the place where it is desired to cut it and the upper limbs are then hinged (Figure 9) to the lower limbs and they are brought together by the lunette 17 (Figure 5 or 10).

The pressure is then applied by means of the lunette 17 (Figure 5); then by acting upon the lever 21 (Figure 7) the locking bars 16 are put in place.

The lunette is then removed (Figure 11) the middle écraseur 12 (Figure 11) is then opened and withdrawn (Figure 12), then the shoe 14 is removed and finally the viscus is cut between the écraseurs 10 and 13 along the écraseur placed along the affected part to be removed (Figure 13).

The stomach closed by the écraseur 13 can then be sewn along the said écraseur over the crushed part $a^1$ which protrudes therefrom.

The écraseur 10 hermetically closes the part of the stomach which it is proposed to remove.

The crushing surfaces of the instrument are preferably roughened in order to prevent any slipping.

It is to be understood that, without departing from the invention, the arrangement can be varied of the members which serve to put the écraseurs in position, to lock them, and to close them.

The details can also be varied of the hinging of the limbs and of their locking arrangement as well as the construction of the pinchers 8 and the lever 9, and the latter may, moreover, be dispensed with in cases where the manipulation of the locking arrangement does not necessitate its employment.

Claims:

1. A visceral clamping device consisting of two levers, one having a transverse pin at one end and the other a recess receiving the pin, said recess extending in the direction of length of the lever and leading out through the end of the same, whereby the levers will be pivoted together at their ends so that they can be quickly connected or disconnected at any angle at which the levers are to each other.

2. A visceral clamping device comprising two levers detachably pivoted together at one end, one lever having a mortise in its free end, and a pivoted and spring pressed coupling member at the free end of the other lever, the said coupling member being T-shaped and automatically entering the said mortise when the levers are brought together.

3. A visceral clamping device comprising two levers detachably pivoted together at one end thereof, and cooperating means on the other ends of the levers for clamping the levers closed, the two levers being constituted by two prismatic bars contacting throughout the entire length of the inner faces thereof when the clamping device is in the closed position, said inner faces having a convex curvature when the levers are opened, in such manner that when closed the said levers shall exert a strong pressure upon each other throughout the entire length thereof.

4. The combination of three pairs of levers adapted to crush the hollow viscera, each pair comprising two levers connected hingewise in a detachable manner at one of their ends and a device designed to unite the opposite ends and a device arranged to hold the said pairs of levers in such a manner as to prevent the outer pairs from opening, substantially as hereinbefore described.

5. The combination of three pairs of levers adapted to crush the viscera each pair comprising two levers connected hingewise in a detachable manner at one of their ends and a device arranged to connect the opposite ends. a device arranged to hold the said pairs of levers in such a manner as to prevent the outer pairs from opening and means for closing all three pairs of levers together substantially as hereinbefore described.

6. The combination of three pairs of levers adapted to crush the hollow viscera each pair comprising two levers connected hingewise in a detachable manner at one of their ends, and means adapted to lock the three pairs of levers together, the said means allowing of afterwards withdrawing the middle pairs of levers from between the two others without disarranging the latter, substantially as hereinbefore described.

7. The combination of several pairs of levers adapted to crush the hollow viscera, and having locking devices adapted to hold said levers in crushing position, and a closing device adapted to engage said levers, the said closing device being separable from said levers.

8. The combination of pairs of levers adapted to crush the hollow viscera, and having locking devices adapted to hold said levers in crushing position and a closing device separably connected with said levers, the said device comprising a lunette adapted to surround the levers and a screw mounted in said lunette and adapted to engage said levers and to force them into crushing position.

In testimony, that I claim the foregoing as my invention I have signed my name in presence of a subscribing witness.

THIERRY JEAN FRANÇOIS MARIE de MARTEL.

Witness:
  MAURICE RAU.